(12) United States Patent
Sun et al.

(10) Patent No.: US 10,892,823 B2
(45) Date of Patent: Jan. 12, 2021

(54) OPTICAL POWER COMPENSATION METHOD AND DEVICE

(71) Applicant: HUAWEI TECHNOLOGIES CO., LTD., Guangdong (CN)

(72) Inventors: Tianbing Sun, Shenzhen (CN); Wei Liu, Wuhan (CN); Zhenqing Zhao, Dongguan (CN); Mengying He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/695,842

(22) Filed: Nov. 26, 2019

(65) Prior Publication Data

US 2020/0099455 A1   Mar. 26, 2020

Related U.S. Application Data

(63) Continuation of application No. PCT/CN2017/086392, filed on May 27, 2017.

(51) Int. Cl.
*H04B 10/079* (2013.01)
*H04J 14/02* (2006.01)

(52) U.S. Cl.
CPC .... *H04B 10/07955* (2013.01); *H04J 14/0221* (2013.01)

(58) Field of Classification Search
CPC ............... H04B 10/07955; H04J 14/0221
See application file for complete search history.

(56) References Cited

U.S. PATENT DOCUMENTS

| | | | |
|---|---|---|---|
| 2010/0226644 A1* | 9/2010 | Ito | H04B 10/0775 398/25 |
| 2011/0051228 A1 | 3/2011 | Gottwald | |
| 2016/0020852 A1* | 1/2016 | Bato | H04B 10/296 398/34 |

(Continued)

FOREIGN PATENT DOCUMENTS

| | | |
|---|---|---|
| CN | 1527526 A | 9/2004 |
| CN | 1592183 A | 3/2005 |

(Continued)

OTHER PUBLICATIONS

International Search Report for PCT/CN2017/086392, dated Feb. 13, 2018, 4 pages.

*Primary Examiner* — Casey L Kretzer

(57) ABSTRACT

An optical power compensation method and a device relating to the communications field comprises: a first node that obtains a first optical power and a first timepoint, receives at least two second optical powers sent by a second node, obtains second timepoints corresponding with the at least two second optical powers, where the second timepoint is a timepoint at which the first node receives the second optical power, and determines a target timepoint from the second timepoints according to a preset delay and the first timepoint. The first node determines a variation of a span loss according to a target optical power and the first optical power, where the target optical power is a second optical power corresponding to the target timepoint, and adjusts a gain value and/or an attenuation value of the first node according to the variation of the span loss.

19 Claims, 11 Drawing Sheets

(56) References Cited

U.S. PATENT DOCUMENTS

2018/0198552 A1* 7/2018 Cress ................. H04J 14/0221

FOREIGN PATENT DOCUMENTS

| | | |
|---|---|---|
| CN | 101141219 A | 3/2008 |
| CN | 101615956 A | 12/2009 |
| CN | 101808257 A | 8/2010 |
| WO | 2014063279 A1 | 5/2014 |
| WO | 2016107428 A1 | 7/2016 |

* cited by examiner

OPTICAL POWER COMPENSATION METHOD AND DEVICE

CROSS-REFERENCE TO RELATED APPLICATIONS

This application is a continuation of International Application No. PCT/CN2017/086392, filed on May 27, 2017. The disclosure of the aforementioned application is hereby incorporated by reference in its entirety.

TECHNICAL FIELD

Embodiments of the present invention relate to the communications field, and in particular, to an optical power compensation method and a device.

BACKGROUND

Wavelength division multiplexing WDM) is a transmission technology in optical fiber communications. The wavelength division multiplexing utilizes a feature that one optical fiber can transmit a plurality of optical carriers with different wavelengths simultaneously, and divides a wavelength range to which the optical fiber may be applied into a plurality of bands, and each band is used as a separate channel to transmit a group of optical carriers with predetermined wavelengths. In a long-distance optical fiber transmission WDM system, when an optical signal is incident on the optical fiber, to ensure optimal transmission performance of the system, as shown in FIG. 1, the same input optical power is set for each optical carrier of the optical signal. If a sum of input optical powers of all the optical carriers exceeds a threshold, stimulated Raman scattering (SRS) occurs for the optical signal and the optical fiber. Because Stokes scattering included in the SRS can lead to a movement from an optical power of a shortwave (the shortwave refers to an optical carrier with a relatively short wavelength) to that of a long wave (the long wave refers to an optical carrier with a relatively long wavelength), an output optical power of the shortwave is reduced, and an output optical power of the long wave is increased, as shown in FIG. 2. Therefore, there is a relatively high possibility that performance of transmitting service data carried on the optical carrier in the WDM system becomes worse. To lower the possibility that the performance of transmitting the service data carried on the optical carrier in the WDM system becomes worse, an output optical power of the optical carrier needs to be compensated.

In the prior art, a method for compensating an output optical power by using an automatic level control (ALC) is provided, and is specifically as follows: When a local node detects that a variation of a span loss exceeds a threshold of 2 dB, a system control and communication (SCC) board of the local node and an SCC board of a source node may be configured to report a threshold-crossing event to a network management system, and the network management system displays alarm information according to the threshold-crossing event, so that the source node enables ALC adjustment and sends an adjustment command to the local node. Therefore, the local node can adjust an attenuation value or a gain value according to the adjustment command, to compensate an output optical power of the local node, so that the output optical power is restored to an ideal value in a normal working state.

In the method for compensating the output optical power by using the ALC, the local node can compensate the output optical power only when the local node detects that an accumulated variation of a span loss exceeds the threshold of 2 dB, and therefore the output optical power cannot be compensated in real time.

SUMMARY

Embodiments of the present invention provide an optical power compensation method and a device, so as to resolve a problem that an output optical power cannot be compensated in real time.

To achieve the foregoing objective, the following ethnical solutions are used in the embodiments of the present invention:

According to a first aspect of the embodiments of the present invention, an optical power compensation method is provided, including:

obtaining, by a first node, a first optical power and a first timepoint, receiving at least two second optical powers sent by a second node, and obtaining second timepoints in a one-to-one correspondence with the at least two second optical powers, where the second timepoint is a timepoint at which the first node receives the second optical power; in addition, determining, by the first node, a target timepoint from the second timepoints in a one-to-one correspondence with the at least two second optical powers according to a preset delay and the first timepoint; and determining, by the first node, a variation of a span loss according to a target optical power and the first optical power, where the target optical power is a second optical power corresponding to the target timepoint, and adjusting a gain value and/or an attenuation value of the first node according to the variation of the span loss.

The first node is a sending node or a receiving node. When the first node is a sending node, the first timepoint is a timepoint at which the first node outputs the first optical power; or when the first node is a receiving node, the first timepoint is a timepoint at which the first node detects the first optical power.

According to the optical power compensation method provided in this embodiment of the present invention, after the first node obtains the first optical power and the first timepoint, receives the at least two second optical powers sent by the second node, and obtains the second timepoints in a one-to-one correspondence with the at least two second optical powers, the first node may determine the target timepoint from the second timepoints in a one-to-one correspondence with the at least two second optical powers according to the preset delay and the first timepoint, determine the variation of the span loss according to the first optical power and the second optical power corresponding to the target timepoint, that is, the target optical power, and adjust the gain value and/or the attenuation value of the first node according to the variation of the span loss. In this way, the first node in this application may determine the first optical power and the target optical power that are in the same event according to the preset delay, determine the variation of the span loss according to the first optical power and the target optical power that are in the same event, and then adjust the gain value and/or the attenuation value of the first node in real time according to the variation of the span loss, thereby achieving a purpose of compensating the output optical power in real time.

With reference to the first aspect, in a possible implementation, the determining, by the first node, a variation of a span loss according to a target optical power and the first optical power may specifically include: determining, by the first node, an absolute value of a difference between the target optical power and the first optical power; and determining the variation of the span loss according to the absolute value of the difference and a pre-stored inherent span loss.

With reference to the first aspect and the foregoing possible implementation, in another possible implementation, to reduce a transmission delay, the receiving, by the first node, at least two second optical powers sent by a second node may specifically include: receiving, by the first node, at least two data packets sent by the second node, where one data packet of the at least two data packets is a data packet obtained after one second optical power of the at least two second optical powers is encoded; and decoding the at least two data packets, to obtain the at least two second optical powers.

With reference to the first aspect and the foregoing possible implementations, in another possible implementation, to avoid a data error caused by high-speed data transmission, after the receiving, by the first node, at least two second optical powers sent by a second node, and obtaining second timepoints in a one-to-one correspondence with the at least two second optical powers, the method may further include: storing, by the first node, the at least two second optical powers and the second timepoints in a one-to-one correspondence with the at least two second optical powers.

With reference to the first aspect and the foregoing possible implementations, in another possible implementation, when the first node is a sending node, the preset delay includes: a delay for transmitting the first optical power output by an optical amplifier (Optical Amplifier, OA) of the first node on an optical fiber, a delay generated when an SCC board of the second node encodes the target optical power to obtain a data packet and sends the data packet to an optical supervisory channel (Optical Supervisory Channel, OSC) board of the second node, a delay for transmitting the data packet sent by the OSC board of the second node on the optical fiber, a delay generated when an OSC board of the first node decodes the data packet to obtain the target optical power, and a delay generated when the OSC board of the first node reports the target optical power to an SCC board of the first node; or when the first node is a receiving node, the preset delay includes: a delay generated when an SCC board of the second node encodes the target optical power to obtain a data packet and sends the data packet to an OSC board of the second node, a delay generated when an OSC board of the first node decodes the data packet to obtain the target optical power, and a delay generated when the OSC board of the first node reports the target optical power to an SCC board of the first node.

A second aspect of the embodiments of the present invention provides a first node, and the first node includes an obtaining unit, a receiving unit, a determining unit, and an adjustment unit. The obtaining unit is configured to obtain a first optical power and a first timepoint. The receiving unit is configured to receive at least two second optical powers sent by a second node. The obtaining unit is further configured to obtain second timepoints in a one-to-one correspondence with the at least two second optical powers, where the second timepoint is a timepoint at which the first node receives the second optical power. The determining unit is configured to: determine, according to a preset delay and the first timepoint obtained by the obtaining unit, a target timepoint from the second timepoints that are obtained by the obtaining unit and that are in a one-to-one correspondence with the at least two second optical powers; and determine, according to a target optical power and the first optical power obtained by the obtaining unit, a variation of a span loss, where the target optical power is a second optical power corresponding to the target timepoint. The adjustment unit is configured to adjust a gain value and/or an attenuation value of the first node according to the variation that is of the span loss and that is determined by the determining unit. The first node is a sending node or a receiving node. When the first node is a sending node, the first timepoint is a timepoint at which the first node outputs the first optical power; or when the first node is a receiving node, the first timepoint is a timepoint at which the first node detects the first optical power.

With reference to the second aspect, in a possible implementation, the determining unit is specifically configured to: determine an absolute value of a difference between the target optical power and the first optical power; and determine the variation of the span loss according to the absolute value of the difference and a pre-stored inherent span loss.

With reference to the second aspect and the foregoing possible implementation, in another possible implementation, the receiving unit is specifically configured to: receive at least two data packets sent by the second node, where one data packet of the at least two data packets is a data packet obtained after one second optical power of the at least two second optical powers is encoded; and decode the at least two data packets, to obtain the at least two second optical powers.

With reference to the second aspect and the foregoing possible implementations, in another possible implementation, the first node further includes a storage unit. The storage unit is configured to store the at least two second optical powers and the second timepoints in a one-to-one correspondence with the at least two second optical powers.

With reference to the second aspect and the foregoing possible implementations, in another possible implementation, when the first node is a sending node, the preset delay includes: a delay for transmitting the first optical power output by an OA of the first node on an optical fiber, a delay generated when an SCC board of the second node encodes the target optical power to obtain a data packet and sends the data packet to an OSC board of the second node, a delay for transmitting the data packet sent by the OSC board of the second node on the optical fiber, a delay generated when an OSC board of the first node decodes the data packet to obtain the target optical power, and a delay generated when the OSC board of the first node reports the target optical power to an SCC board of the first node; or when the first node is a receiving node, the preset delay includes: a delay generated when an SCC board of the second node encodes the target optical power to obtain a data packet and sends the data packet to an OSC board of the second node, a delay generated when an OSC board of the first node decodes the data packet to obtain the target optical power, and a delay generated when the OSC board of the first node reports the target optical power to an SCC board of the first node.

For a specific implementation, refer to an operation and a function of the first node in the optical power compensation method provided in the first aspect or the possible implementations of the first aspect.

A third aspect of the embodiments of the present invention provides a first node, and the first node includes at least one processor, a memory, a communications interface, and a communications bus. The memory is configured to store a computer-executable instruction. The processor, the communications interface, and the memory are connected by using the communications bus. When the first node runs, the processor executes the computer-executable instruction stored by the memory, so that the first node performs the optical power compensation method described in the first aspect or the possible implementations of the first aspect.

A fourth aspect of the embodiments of the present invention provides a computer storage medium, and the computer storage medium is configured to store a computer software instruction used by the foregoing first node, where the computer software instruction includes a program designed for performing the foregoing optical power compensation method.

DETAILED DESCRIPTION OF EXAMPLE EMBODIMENTS

In a long-distance optical fiber transmission WDM system, when a sum of input optical powers of all optical carriers in an optical signal exceeds a threshold, SRS occurs for the optical signal and an optical fiber, and therefore an output optical power of the optical carrier changes. Specifically, the SRS may include Stokes scattering and anti-Stokes scattering. In addition, according to quantum mechanics, an optical signal includes a plurality of incident photons. A specific process of the Stokes scattering is as follows: Because a phonon in the optical fiber is in a ground state before the Stokes scattering occurs, the incident photon is scattered into a low-energy Stokes photon by the phonon in the optical fiber, and the phonon is stimulated from the ground state to a high-energy level because the phonon absorbs energy of the incident photon. After the Stokes scattering occurs, the energy of the incident photon is absorbed by the phonon in the optical fiber, and therefore a frequency of the incident photon is reduced, that is, a wavelength of the incident photon becomes longer. Therefore, an optical power of a shortwave moves to that of a long wave, an output optical power of the shortwave is reduced, and an output optical power of the long wave is increased. A specific process of the anti-Stokes scattering is as follows: Before the anti-Stokes scattering occurs, a phonon in the optical fiber is at a high-energy level, and therefore the incident photon becomes an incident photon with higher energy by absorbing energy of the phonon in the optical fiber, and the phonon restores from the high-energy level to a ground state because the energy is absorbed by the incident photon. After the anti-Stokes scattering occurs, the incident photon absorbs the energy of the phonon in the optical fiber, and therefore a frequency of the incident photon is increased, that is, a wavelength of the incident photon becomes shorter. Therefore, an optical power of a long wave moves to that of a shortwave, an output optical power of the long wave is reduced, and an output optical power of the shortwave is increased. In the embodiments of the present invention, that the Stokes scattering occurs in the long-distance optical fiber transmission WDM system is used as an example for description. The optical power of the shortwave moves to that of the long wave because of the Stokes scattering, and therefore there is a relatively high possibility that performance of transmitting service data carried on the optical carrier in the long-distance optical fiber transmission WDM system becomes worse. To lower the possibility that the performance of transmitting the service data carried on the optical carrier in the long-distance optical fiber transmission WDM system becomes worse, an output optical power of the optical carrier needs to be compensated.

Figure 1:
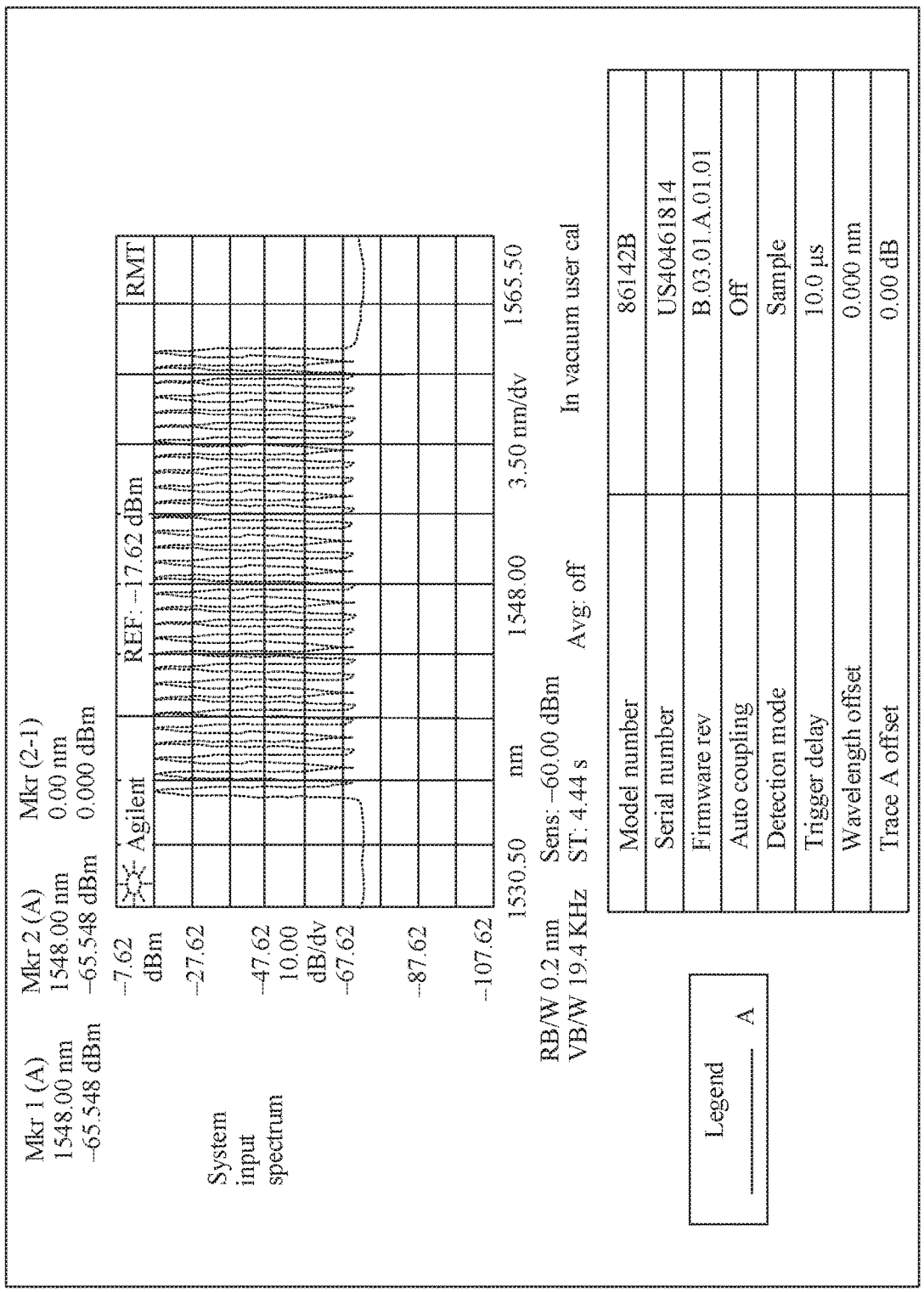
FIG. 1 is a schematic diagram of an input optical power in a long-distance optical fiber transmission WDM system according to the prior art.
Figure 2:
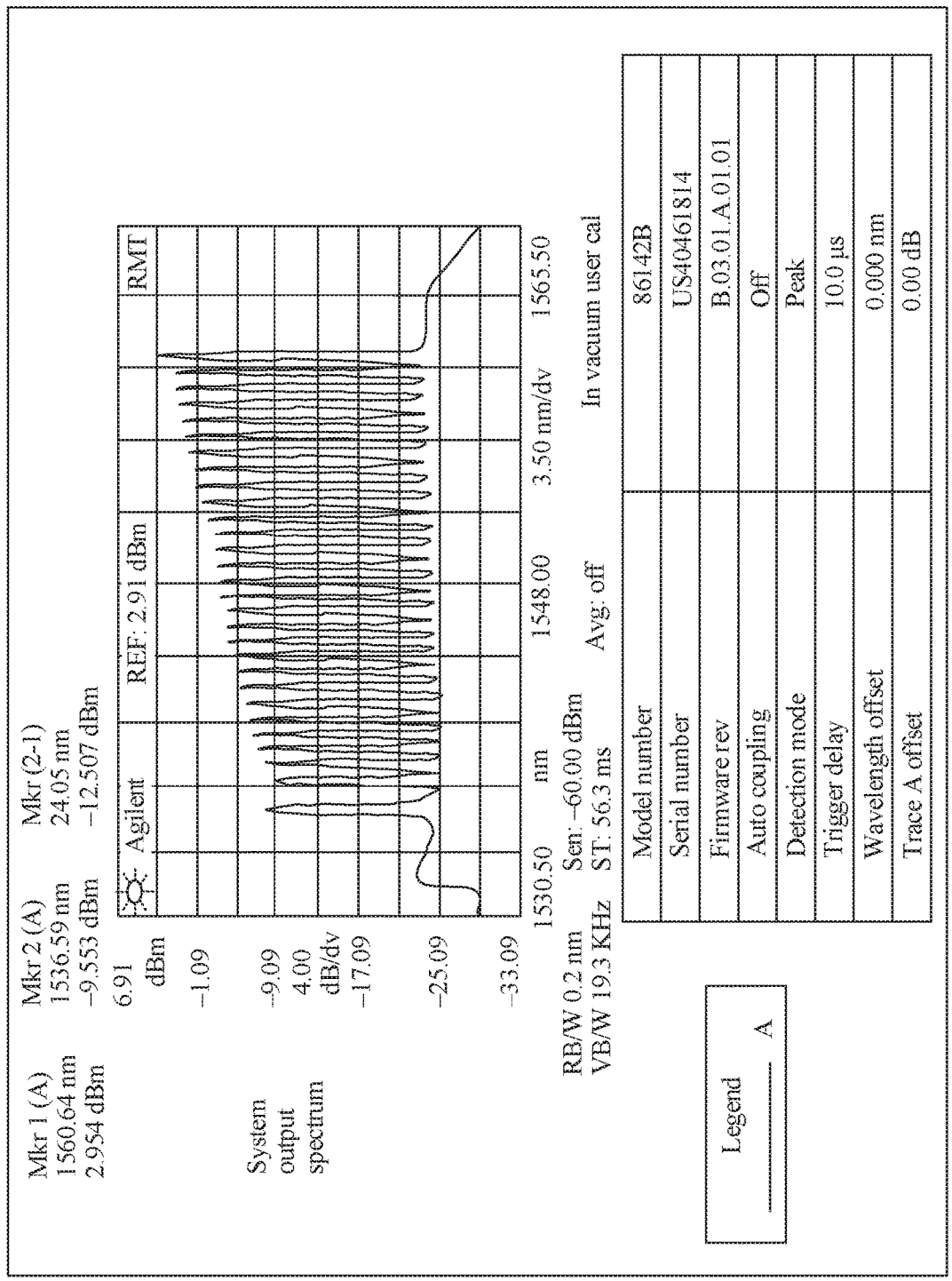
FIG. 2 is a schematic diagram of an output optical power in a long-distance optical fiber transmission WDM system according to the prior art.
Figure 3:
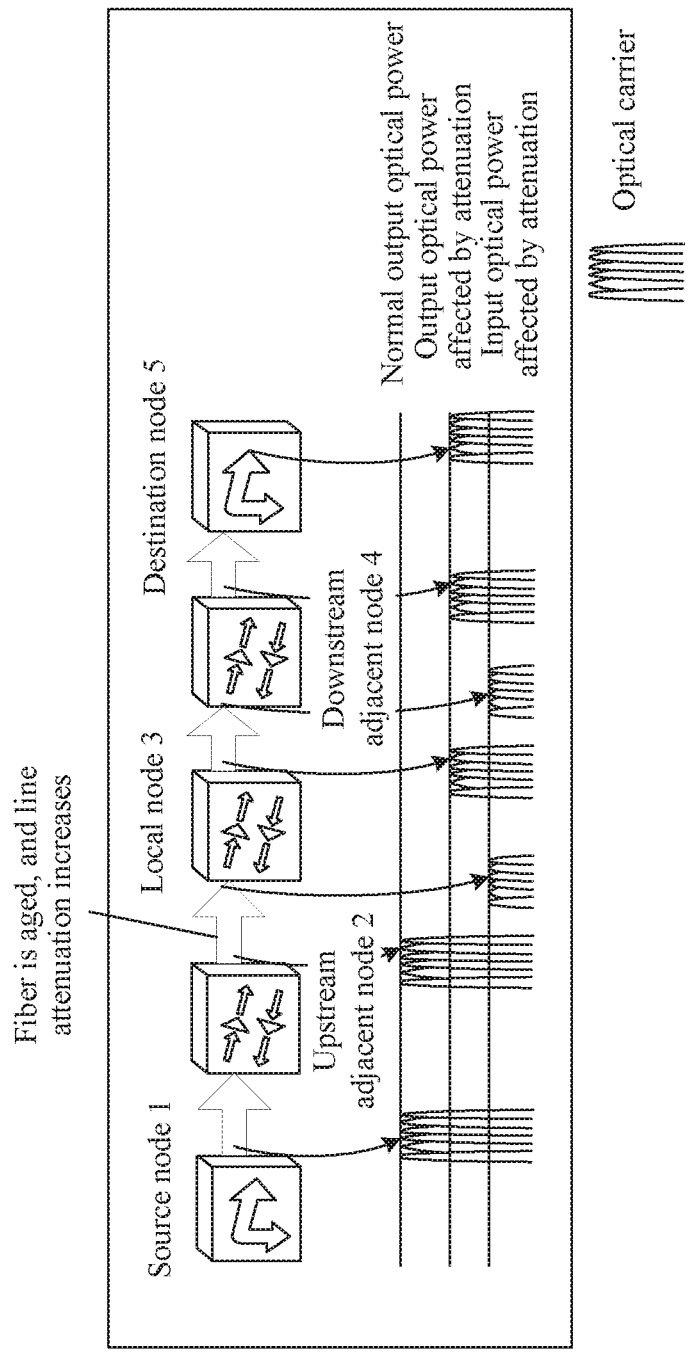
FIG. 3 is a schematic diagram of an output optical power before a method for compensating the output optical power by using an ALC is used according to the prior art.
Figure 4:
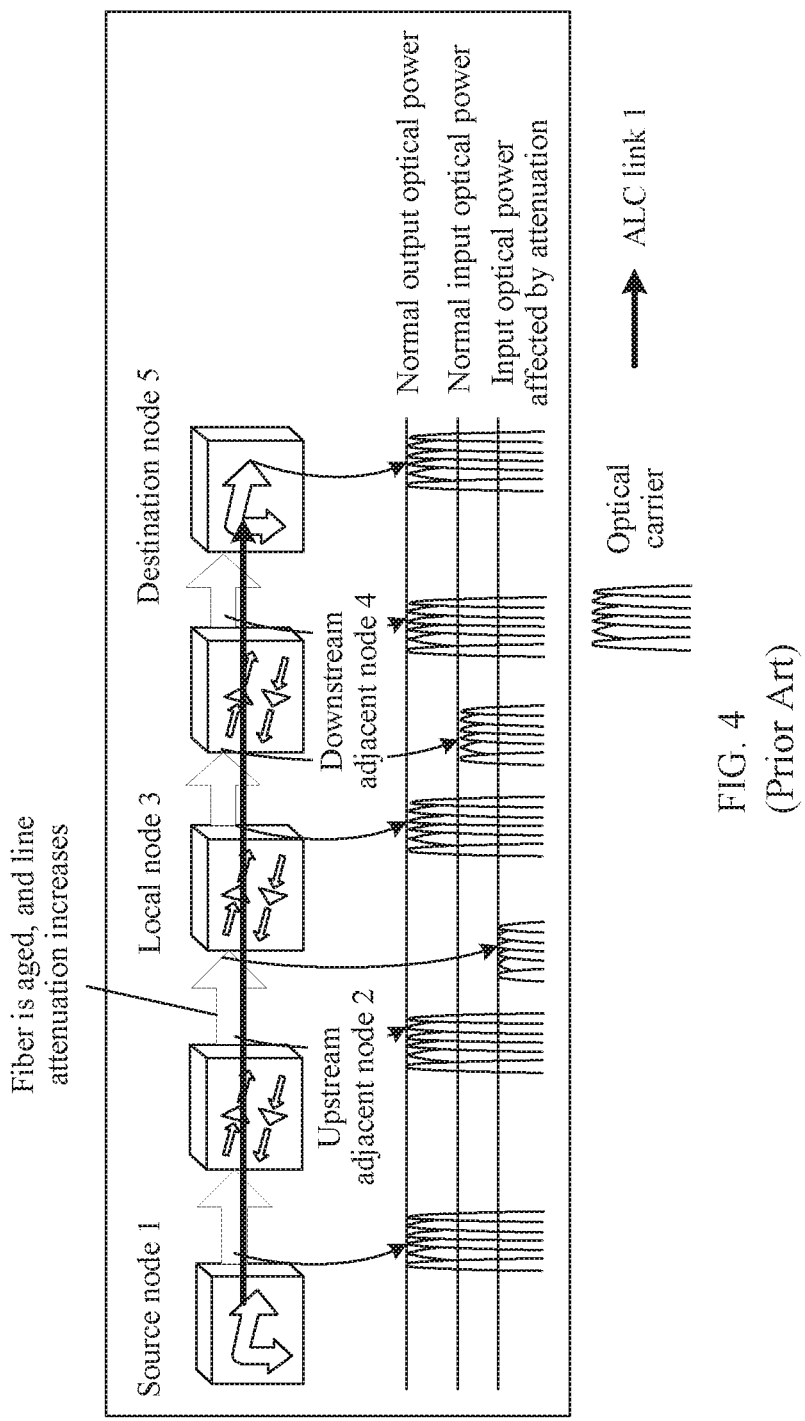
FIG. 4 is a schematic diagram of an output optical power after a method for compensating the output optical power by using an ALC is used according to the prior art.

In the prior art, a method for compensating an output optical power by using an ALC is provided. An increase in a span loss of the optical fiber can be caused by factors such as aging of the optical fiber, aging of an optical connector, a synchronous increase or decrease in a plurality of wavelengths, and changing of an input optical power, and therefore an output optical power is reduced, thereby greatly affecting an optical signal-to-noise ratio (Optical Signal To Noise Ratio, OSNR) of a system. According to the method for compensating the output optical power by using the ALC, the output optical power may be restored to an ideal value in a normal working state, so that impact on the OSNR of the system is reduced. For example, it is assumed that the system as shown in FIG. 3 includes a source node 1, an upstream adjacent node 2, a local node 3, a downstream adjacent node 4, and a destination node 5. When aging of an optical fiber between the upstream adjacent node 2 and the local node 3 causes an increase in a span loss between the upstream adjacent node 2 and the local node 3, a change in an output optical power before and after the method for compensating the output optical power by using the ALC is used may be learned by comparing FIG. 3 and FIG. 4. FIG. 3 is a schematic diagram of an output optical power before a method for compensating the output optical power by using an ALC is used. As shown in FIG. 3, aging of an optical fiber between the upstream adjacent node 2 and the local node 3 causes a decrease in an input optical power of the local node 3, and therefore an output optical power after the input optical power passes through an OA is also reduced, and an output optical power of the destination node 5 is also reduced. FIG. 4 is a schematic diagram of an output optical power after a method for compensating the output optical power by using an ALC is used. As shown in FIG. 4, aging of an optical fiber between the upstream adjacent node 2 and the local node 3 causes a decrease in an input optical power of the local node 3, but an output optical power of the local node 3 is restored to an ideal value in a normal working state through automatic adjustment of an ALC link 1, and therefore an output optical power of the destination node 5 is also restored to an ideal value in a normal working state.

Figure 5:
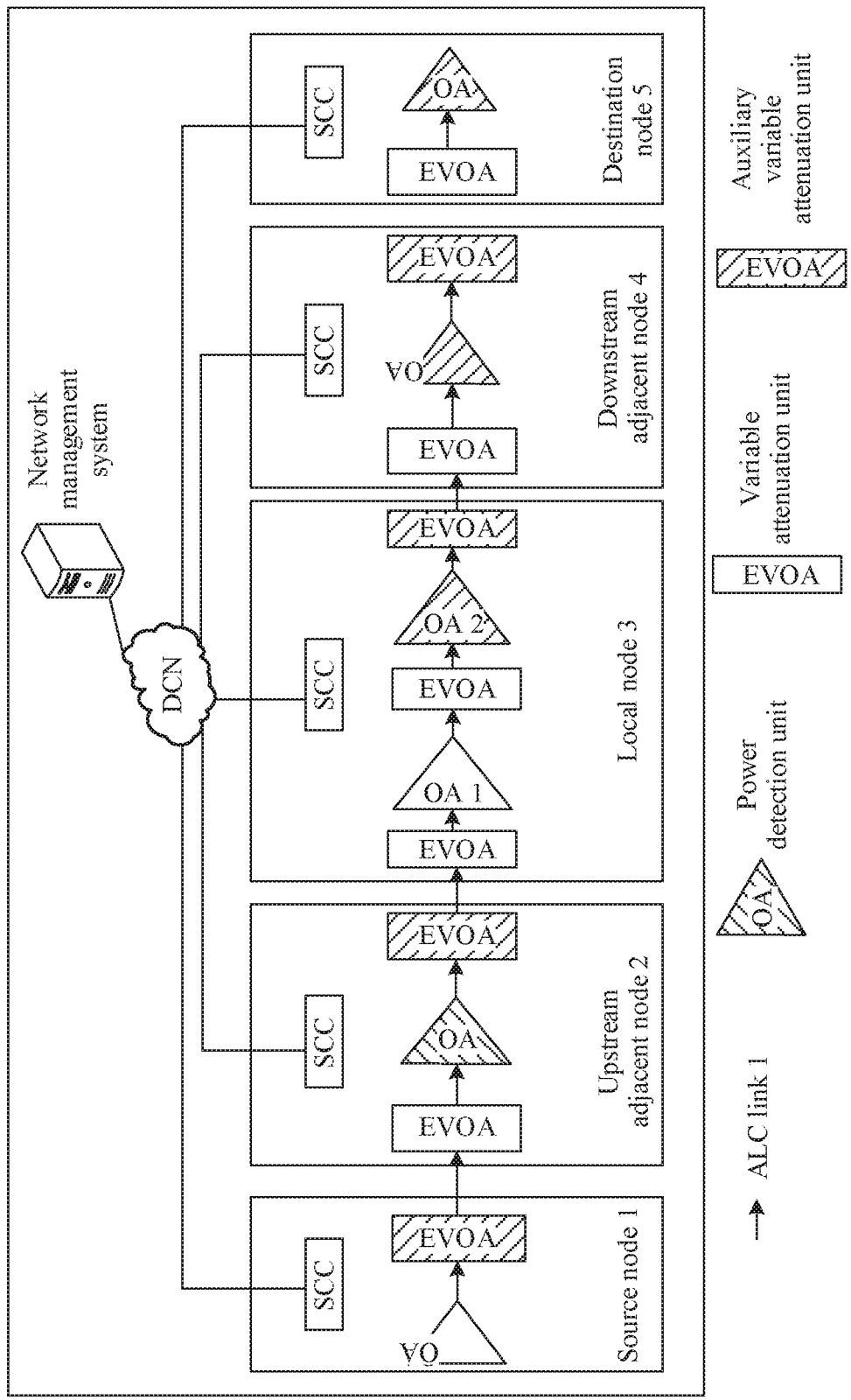
FIG. 5 is a schematic diagram of an implementation principle of a method for compensating an output optical power by using an ALC according to the prior art.

FIG. 5 is a schematic diagram of an implementation principle of a method for compensating an output optical power by using an ALC. As shown in FIG. 5, the method for compensating the output optical power by using the ALC is specifically as follows: First, an obtained span loss and local gain in an ideal state are pre-stored in each node according to a formula 1: the span loss=an upstream output optical power−a local input optical power and a formula 2: the local gain=a nominal output optical power of a local optical amplifier board−a nominal output optical power of an upstream optical amplifier board+the span loss, and are used as a reference value for ALC adjustment. Then, deployment and debugging are performed, so that a system runs normally. In this case, the source node 1 may periodically send an inquiry message to downstream nodes such as the upstream adjacent node 2, the local node 3, the downstream adjacent node 4, and the destination node 5, and power detection units (for example, OAs) of the upstream adjacent node 2, the local node 3, the downstream adjacent node 4, and the destination node 5 may obtain an actual span loss, compare the actual span loss with the pre-stored span loss to determine a variation of the span loss, and report the variation to the source node 1. It is assumed that an optical fiber between the source node 1 and the upstream adjacent node 2 is aged. The power detection unit of the upstream adjacent node 2 may determine a variation of a span loss. It is assumed that the variation of the span loss does not exceed a threshold of 2 dB. In addition, it is assumed that an optical fiber between the upstream adjacent node 2 and the local node 3 is aged. The power detection unit of the local node 3 may determine an accumulated variation of a span loss from the source node 1 to the local node 3. It is assumed that the variation of the span loss exceeds the threshold of 2 dB. The power detection unit of the local node 3 may report a threshold-crossing event to an SCC board of the local node 3. The SCC board of the local node 3 may report the threshold-crossing event to an SCC board of the source node 1 by using a data communications network (Data Communication Network, DCN), and then the SCC board of the source node 1 reports the threshold-crossing event to a network management system. After receiving the threshold-crossing event, the network management system displays alarm information, so that a user manually enables ALC adjustment of the source node; or the network management system sends alarm information to the source node 1 by using the DCN, so that the source node 1 automatically enables ALC adjustment. After the ALC adjustment is enabled, the source node 1 may send a pre-adjustment command to the downstream node, to collect link information, such as information about a quantity of downstream nodes and an output optical power of the downstream node. Then, the source node 1 may send an adjustment command to the upstream adjacent node 2, so that the upstream adjacent node 2 adjusts attenuation values of an auxiliary variable attenuation unit of the source node 1 and a variable attenuation unit of the upstream adjacent node 2 (for example, both the auxiliary variable attenuation unit and the variable attenuation unit may be electrical variable optical attenuators (Electrical Variable Optical Attenuator, EVOA)) and a gain value of the power detection unit of the upstream adjacent node 2, so that the output optical power of the upstream adjacent node 2 is restored to an ideal value in a normal working state. After completing the adjustment, the upstream adjacent node 2 may send an adjustment command to the local node 3. The local node 3 may adjust attenuation values of an auxiliary variable attenuation unit of the upstream adjacent node 2 and a variable attenuation unit of the local node 3 and a gain value of the power detection unit of the local node 3 according to the adjustment command, to compensate the output optical power of the local node 3, so that the output optical power is restored to an ideal value in a normal working state. Considering that the output optical power of the local node 3 affects output optical powers of the downstream adjacent node 4 and the destination node 5, after completing the adjustment, the local node 3 sends an adjustment command to the downstream adjacent node 4, to compensate the output optical power of the downstream adjacent node 4. After performing the adjustment, the downstream adjacent node 4 may send an adjustment instruction to the destination node 5, to compensate the output optical power of the destination node 5. After completing the adjustment, the destination node 5 may send, by using the DCN and to the source node 1, a message that the adjustment ends. In this way, the ALC adjustment is complete. In FIG. 5, the OA is used as the power detection unit, and the EVOA is used as the variable attenuation unit and the auxiliary variable attenuation unit.

However, in the prior-art method for compensating the output optical power by using the ALC, only when the local node detects that an accumulated variation of a span loss exceeds the threshold of 2 dB can the local node compensate the output optical power, and therefore the output optical power cannot be compensated in real time. To resolve a problem that the output optical power cannot be compensated in real time, the embodiments of the present invention provide an optical power compensation method. A basic principle of the method is as follows: A first node obtains a first optical power and a first timepoint, receives at least two second optical powers sent by a second node, and obtains second timepoints in a one-to-one correspondence with the at least two second optical powers, where the second timepoint is a timepoint at which the first node receives the second optical power; the first node determines a target timepoint from the second timepoints in a one-to-one correspondence with the at least two second optical powers according to a preset delay and the first timepoint; the first node determines a variation of a span loss according to a target optical power and the first optical power, where the target optical power is a second optical power corresponding to the target timepoint, and adjusts a gain value and/or an attenuation value of the first node according to the variation of the span loss; the first node is a sending node or a receiving node, and when the first node is a sending node, the first timepoint is a timepoint at which the first node outputs the first optical power, or when the first node is a receiving node, the first timepoint is a timepoint at which the first node detects the first optical power. In this way, the first node in this application may determine the first optical power and the target optical power that are in the same event according to the preset delay, determine the variation of the span loss according to the first optical power and the target optical power that are in the same event, and then adjust the gain value and/or the attenuation value of the first node in real time according to the variation of the span loss, thereby achieving a purpose of compensating the output optical power in real time.

The following describes implementations of the embodiments of the present invention in detail with reference to the accompanying drawings.

Figure 6:
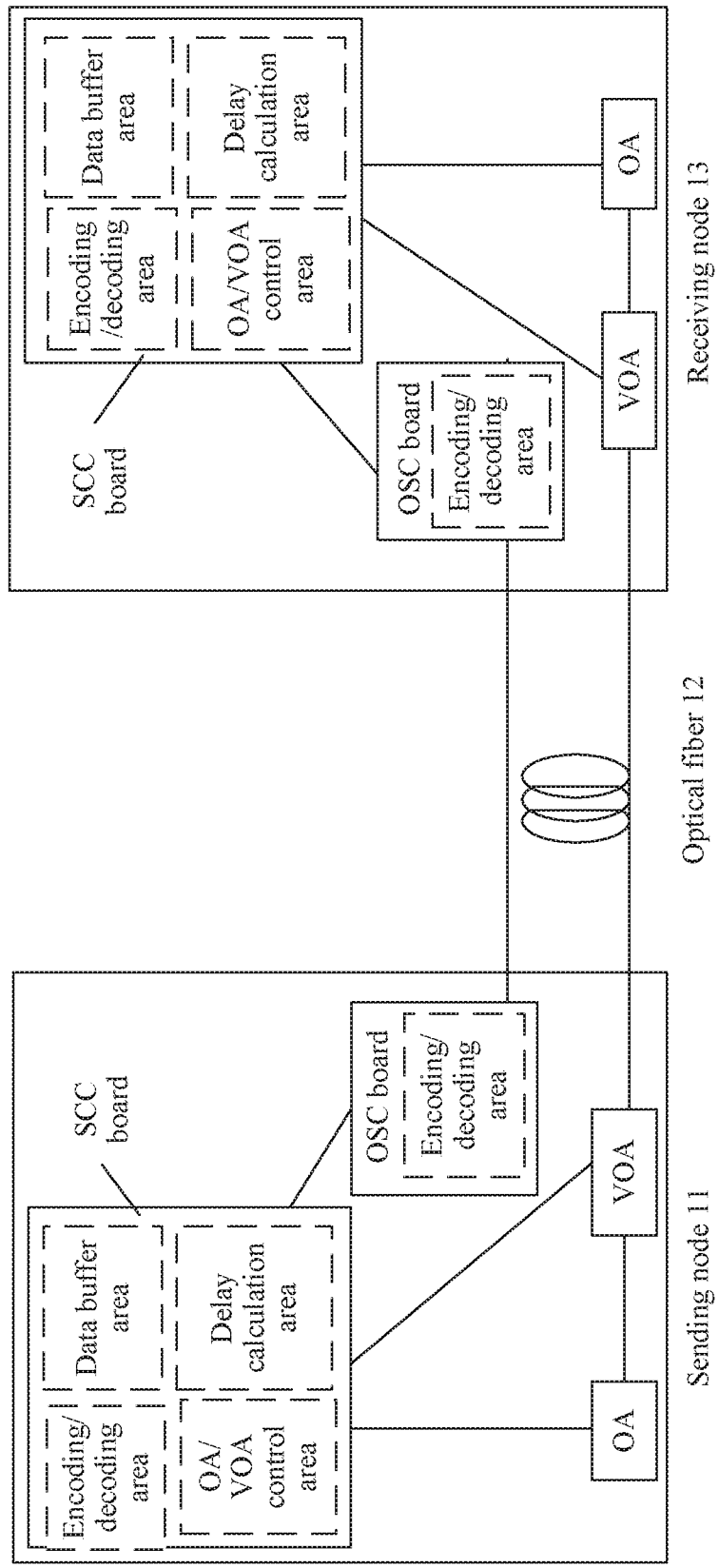
FIG. 6 is a simplified schematic diagram of a long-distance optical fiber transmission WDM system that can be applied to an embodiment of the present invention according to an embodiment of the present invention.

FIG. 6 is a simplified schematic diagram of a long-distance optical fiber transmission WDM system that can be applied to an embodiment of the present invention, and the system is applied to a scenario in which a spacing of a channel between a C band (band) and an L band is relatively wide, an optical carrier of the C band and an optical carrier of the L band are amplified separately by using an OA such as an erbium-doped fiber amplifier (Erbium-Doped. Fiber Amplifier, EDEA), and wavelength adding or wavelength dropping is performed on the C band and the L band. As shown in FIG. 6, the long-distance optical fiber transmission WDM system includes a sending node 11, an optical fiber 12, and a receiving node 13.

The sending node 11 and the receiving node 13 communicate with each other by using the optical fiber 12. In specific implementation, when the sending node 11 is a first node, the receiving node 13 is a second node; or when the sending node 11 is a second node, the receiving node 13 is a first node.

Both the sending node 11 and the receiving node 13 are nodes on which an SCC board, an OSC board, an OA, and a variable optical attenuator (Variable Optical Attenuator, VOA) are installed. The OA and the VOA may be integrated into one board, or may be separately disposed on different boards.

In this embodiment of the present invention, when Stokes scattering occurs, an output optical power may be compensated by adjusting a gain value and/or an attenuation value of the sending node 11, or an output optical power may be compensated by adjusting a gain value and/or an attenuation value of the receiving node 13.

When the output optical power is compensated by adjusting the gain value and/or the attenuation value of the sending node 11, the OA of the sending node 11 is configured to continuously output a first optical power, is configured to periodically obtain the first optical power and a first timepoint corresponding to the first optical power, and is further configured to adjust the gain value according to an adjustment instruction. The SCC board of the sending node 11 is configured to receive the first optical power and the first timepoint that are reported by the OA of the sending node 11, is configured to receive at least two second optical powers reported by the OSC board of the sending node 11, and is further configured to obtain second timepoints in a one-to-one correspondence with the at least two second optical powers. In addition, a delay calculation area, a data buffer area, and an OA/VOA control area may be integrated on the SCC board of the sending node 11. The delay calculation area is used to determine a variation of a span loss. The data buffer area is used to store the at least two second optical powers and the second timepoints in a one-to-one correspondence with the at least two second optical powers. The OA/VOA control area is used to send an adjustment instruction to the OA of the sending node 11 and/or the VOA of the sending node 11. The OSC board of the sending node 11 is configured to receive a data packet sent by the receiving node 13. In addition, an encoding/decoding area may be integrated on the OSC board of the sending node 11, and is used to decode the data packet, to obtain the second optical power. The VOA of the sending node 11 is configured to adjust the attenuation value according to the adjustment instruction. The OA of the receiving node 13 is configured to detect the second optical power. The SCC board of the receiving node 13 is configured to receive the second optical power reported by the OA of the receiving node 13. In addition, an encoding/decoding area may be integrated on the SCC board of the receiving node 13, and is used to encode the second optical power, to obtain the data packet. The OSC board of the receiving node 13 is configured to send the data packet to the OSC board of the sending node 11.

It should be noted that, after the output optical power is compensated by adjusting the gain value and/or the attenuation value of the sending node 11, when Stokes scattering occurs between the receiving node 13 and a downstream adjacent node of the receiving node 13, the receiving node 13 may be used as a sending node for the downstream adjacent node to compensate the output optical power. This method for compensating the output optical power is the same as the method for compensating the output optical power by the sending node 11.

When the output optical power is compensated by adjusting the gain value and/or the attenuation value of the receiving node 13, the OA of the receiving node 13 is configured to detect a first optical power, is configured to periodically obtain the first optical power and a first timepoint corresponding to the first optical power, and is further configured to adjust the gain value according to an adjustment instruction. The SCC board of the receiving node 13 is configured to receive the first optical power and the first timepoint that are reported by the OA of the receiving node 13, is configured to receive at least two second optical powers reported by the OSC board of the receiving node 13, and is further configured to obtain second timepoints in a one-to-one correspondence with the at least two second optical powers. In addition, a delay calculation area, a data buffer area, and an OA/VOA control area may be integrated on the SCC board of the receiving node 13. The delay calculation area is used to determine a variation of a span loss. The data buffer area is used to store the at least two second optical powers and the second timepoints in a one-to-one correspondence with the at least two second optical powers. The OA/VOA control area is used to send an adjustment instruction to the OA of the receiving node 13 and/or the VOA of the receiving node 13, The OSC board of the receiving node 13 is configured to receive a data packet sent by the sending node 11. In addition, an encoding/decoding area may be integrated on the OSC board of the receiving node 13, and is used to decode the data packet, to obtain the second optical power. The VOA of the receiving node 13 is configured to adjust the attenuation value according to the adjustment instruction. The OA of the sending node 11 is configured to continuously output the second optical power. The SCC board of the sending node 11 is configured to receive the second optical power reported by the OA of the sending node 11. In addition, an encoding/decoding area may be integrated on the SCC board of the sending node 11, and is used to encode the second optical power, to obtain the data packet. The OSC board of the sending node 11 is configured to send the data packet to the OSC board of the receiving node 13.

It should be noted that the span loss in this embodiment of the present invention is a loss that occurs when an optical power output by a sending node is transmitted on an optical fiber.

Figure 7:
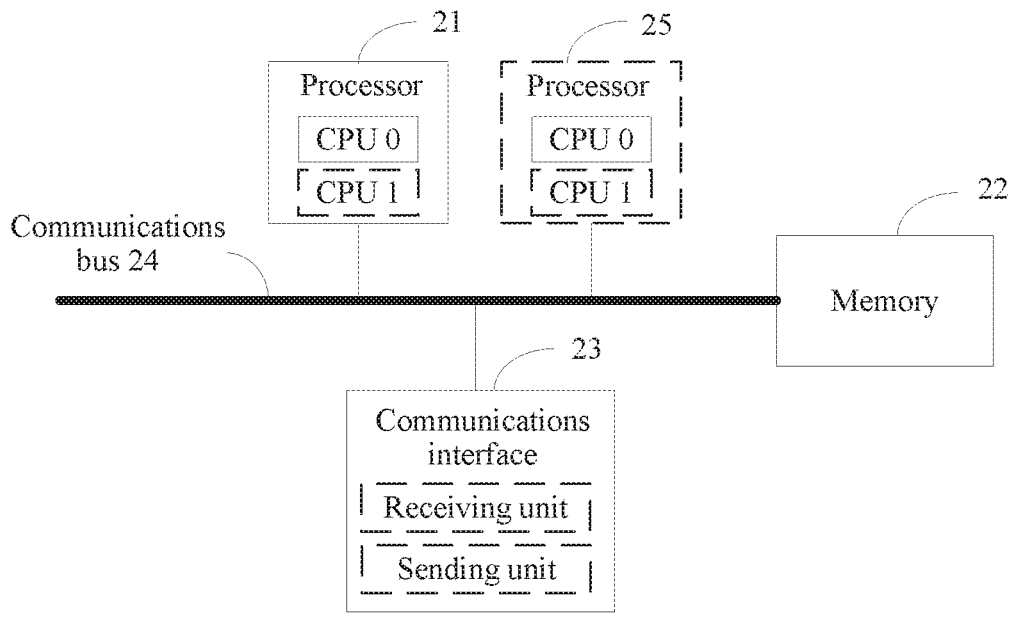
FIG. 7 is a schematic diagram of composition of a first node according to an embodiment of the present invention.

FIG. 7 is a schematic diagram of composition of a first node according to an embodiment of the present invention.

The first node may be a sending node, or may be a receiving node. As shown in FIG. 7, the first node may include at least one processor 21, a memory 22, a communications interface 23, and a communications bus 24.

The following describes all constituent components of the first node in detail with reference to FIG. 7.

The processor 21 may be one processor, or may be a collective term for a plurality of processing elements. For example, the processor 21 may be a general central processing unit (Central Processing Unit, CPU), or may be an application-specific integrated circuit (Application-Specific Integrated Circuit, ASIC), or one or more integrated circuits configured to control execution for a program of a solution of an embodiment of the present invention, for example, one or more micro-processors (Digital Signal Processor, DSP) or one or more field programmable gate arrays (Field Programmable Gate Array, FPGA). The processor 21 may run or perform a software program stored in the memory 22, and invoke data stored in the memory 22, so as to perform various functions of the first node.

In specific implementation, in an embodiment, the processor 21 may include one or more CPUs, for example, a CPU 0 and a CPU 1 shown in FIG. 7.

In specific implementation, in an embodiment, the first node may include a plurality of processors, for example, a processor 21 and a processor 25 shown in FIG. 7. Each of these processors may be a single-core processor (Single-CPU) or a multi-core processor (Multi-CPU). The processor herein may be one or more devices, circuits, and/or processing cores configured to process data (for example, a computer program instruction).

The memory 22 may be a read-only memory (Read-Only Memory, ROM) or another type of static storage device that can store static information and instructions, or a random access memory (Random Access Memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD-ROM), or another compact disc storage, an optical disc storage (including a compact disc, a laser disc, an optical disc, a digital versatile disc, and a Blu-ray disc, or the like), a disk storage medium or another disk storage device, or any other medium that can be used to carry or store expected program code in an instruction or data structure form and that can be accessed by a computer. However, the memory is not limited herein. The memory 22 may exist independently, and is connected to the processor 21 by using the communications bus 24. Alternatively, the memory 22 may be integrated with the processor 21.

The memory 22 is configured to store a software program that performs the solution of an embodiment of the present invention, and the processor 21 controls execution of the software program.

The communications interface 23 is configured to communicate with another device or communications network, such as an Ethernet network, a radio access network (Radio Access Network, RAN), or a wireless local area network (Wireless Local Area Network, WLAN). The communications interface 23 may include a receiving unit for implementing a receiving function, and a sending unit for implementing a sending function.

The communications bus 24 may be an industry standard architecture (Industry Standard Architecture, ISA) bus, a Peripheral Component interconnect (Peripheral Component interconnect, PCI) bus, an extended industry standard architecture (Extended Industry Standard Architecture, EISA) bus, or the like. The bus may be classified into an address bus, a data bus, a control bus, and the like. For ease of representation the bus is represented by using only one thick line is used in FIG. 7, but it does not indicate that there is only one bus or one type of bus.

The structure of the device shown in FIG. 7 does not constitute a limitation on the first node. The device may include components more or fewer than those shown in the figure, a combination of some components, or different component arrangements.

Figure 8:
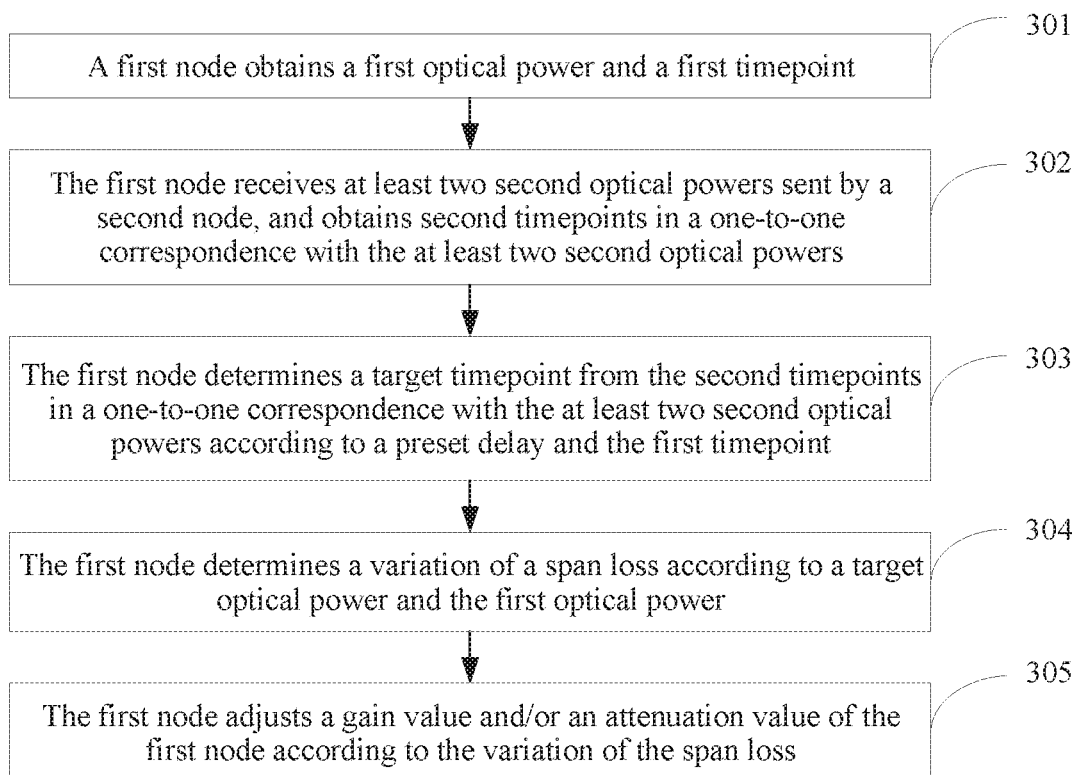
FIG. 8 is a flowchart of an optical power compensation method according to an embodiment of the present invention.

FIG. 8 is a flowchart of an optical power compensation method according to an embodiment of the present invention. As shown in FIG. 8, the method may include the following steps.

It should be noted that, if Stokes scattering occurs in a long-distance optical fiber transmission WDM system, wavelength adding or wavelength dropping may be performed on a sending node at any time, and therefore both an output optical power of the sending node and a variation of a span loss changes accordingly; in addition, the variation of the span loss needs to be determined according to the optical power output by the sending node and an optical power detected by a receiving node in the same event. Therefore, the following step 301 to step 305 may be performed to compensate an output optical power of the receiving node in real time.

301. A first node obtains a first optical power and a first timepoint.

302. The first node receives at least two second optical powers sent by a second node, and obtains second timepoints in a one-to-one correspondence with the at least two second optical powers.

If the first node is a sending node, and the second node is a receiving node, when the long-distance optical fiber transmission WDM system starts working, the first node may continuously output the first optical power, read one first optical power at a predetermined time interval, and obtain a timepoint, that is, the first timepoint, at which the first optical power is output, to obtain a plurality of first optical powers and first timepoints in a one-to-one correspondence with the plurality of first optical powers. After the first optical power output by the first node is transmitted to the second node by using an optical fiber, the second node may correspondingly detect the second optical power, and read one second optical power at a predetermined time interval; and after reading the second optical power every time, the second node may send the second optical power to the first node. Therefore, the first node may receive the at least two second optical powers sent by the second node, and obtain a timepoint, that is, a second timepoint, at which each second optical power is received.

If the first node is a receiving node, and the second node is a sending node, when the long-distance optical fiber transmission WDM system starts working, the second node may continuously output the second optical power, and read one second optical power at a predetermined time interval; and after reading one second power every time, the second node may send the second optical power to the first node. After the second optical power output by the second node is transmitted to the first node by using an optical fiber, the first node may correspondingly detect the first optical power, read one first optical power at a predetermined time interval, and obtain a timepoint, that is, the first timepoint, at which the first optical power is detected, to obtain a plurality of first optical powers and first timepoints in a one-to-one correspondence with the plurality of first optical powers. In addition, the first node may receive the at least two second optical powers sent by the second node, and obtain a timepoint, that is, a second timepoint, at which each second optical power is received.

It should be noted that, in specific implementation, the predetermined time at which the first node reads the first optical power and the predetermined time at which the second node reads the second optical power may be respectively preset on the first node and the second node. In addition, the predetermined time may be set to an extremely small value, so that the first node can determine a first optical power and a second optical power in the same event.

In addition, for each first optical power of the plurality of first optical powers obtained by the first node, the first node may compensate an output optical power by performing the following step 303 to step 305.

303. The first node determines, according to a preset delay and the first timepoint, a target timepoint from the second timepoints in a one-to-one correspondence with the at least two second optical powers.

After the first node obtains the first optical power and the first timepoint, receives the at least two second optical powers sent by the second node, and obtains the second timepoints in a one-to-one correspondence with the at least two second optical powers, the first node may determine a sum of the first timepoint and the preset delay, searches for a second timepoint that is the same as the sum from the second timepoints in a one-to-one correspondence with the at least two second optical powers, and determines the second timepoint as the target timepoint. In this way, the first optical power and a second optical power corresponding to the target timepoint, that is, a target optical power, are the first optical power and the second optical power that are in the same event.

304. The first node determines a variation of a span loss according to a target optical power and the first optical power.

After the first node determines the target timepoint, the first node may determine the variation of the span loss according to the first optical power and the second optical power corresponding to the target timepoint, that is, the target optical power. Because of Stokes scattering, an output optical power of a shortwave is reduced, and an output optical power of a long wave is increased. Therefore, for the shortwave, the first node may determine an increment of the span loss; and for the long wave, the first node may determine a decrement of the span loss.

305. The first node adjusts a gain value and/or an attenuation value of the first node according to the variation of the span loss.

When the first node is a sending node, the first node may adjust the gain value and/or the attenuation value of the first node according to the variation of the span loss, to compensate the first optical power, so that the output optical power of the second node is restored to an ideal value in a normal working state. When the first node is a receiving node, the first node may adjust the gain value or the attenuation value of the first node according to the variation of the span loss, to compensate the output optical power of the first node, so that the output optical power is restored to an ideal value in a normal working state.

According to the optical power compensation method provided in this embodiment of the present invention, after the first node obtains the first optical power and the first timepoint, receives the at least two second optical powers sent by the second node, and obtains the second timepoints in a one-to-one correspondence with the at least two second optical powers, the first node may determine the target timepoint from the second timepoints in a one-to-one correspondence with the at least two second optical powers according to the preset delay and the first timepoint, determine the variation of the span loss according to the first optical power and the second optical power corresponding to the target timepoint, that is, the target optical power, and adjust the gain value and/or the attenuation value of the first node according to the variation of the span loss. In this way, the first node in this application may determine the first optical power and the target optical power that are in the same event according to the preset delay, determine the variation of the span loss according to the first optical power and the target optical power that are in the same event, and then adjust the gain value and/or the attenuation value of the first node in real time according to the variation of the span loss, thereby achieving a purpose of compensating the output optical power in real time.

Figure 9:
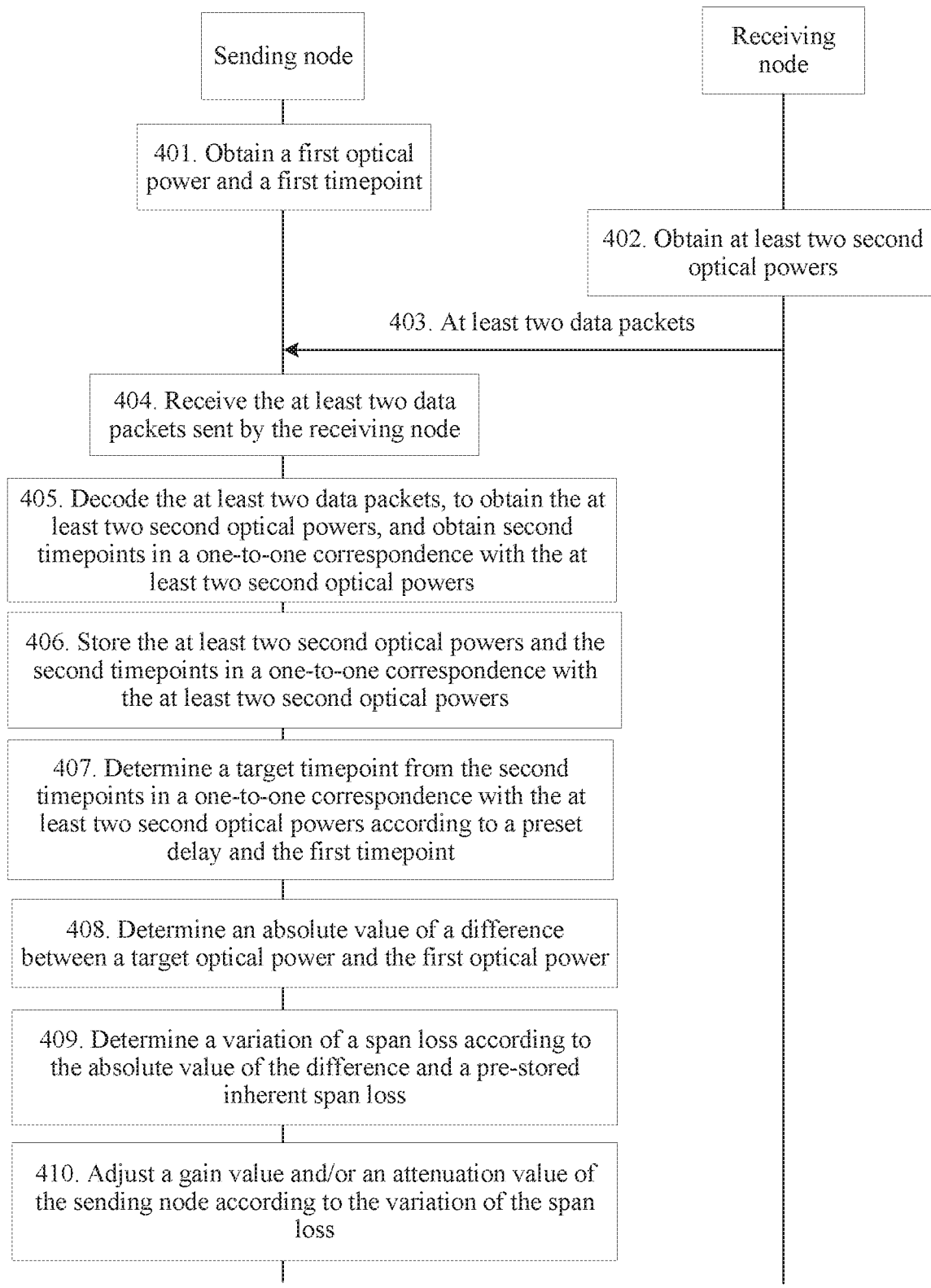
FIG. 9 is a flowchart of another optical power compensation method according to an embodiment of the present invention.

FIG. 9 is a flowchart of another optical power compensation method according to an embodiment of the present invention. As shown in FIG. 9, when a first node is a sending node, and a second node is a receiving node, the method may include the following steps.

401. The sending node obtains a first optical power and a first timepoint.

To compensate an output optical power in real time, when a long-distance optical fiber transmission WWI system starts working, an OA of the sending node may continuously output the first optical power, read one first optical power at a predetermined time interval, and obtain a timepoint, that is, the first timepoint, at which the first optical power is output, to obtain a plurality of first optical powers and first timepoints in a one-to-one correspondence with the plurality of first optical powers. In addition, after the OA of the sending node reads the one first optical power every time and obtains the first timepoint corresponding to the first optical power, the OA may report the first optical power and the first timepoint to an SCC board of the sending node. Therefore, the SCC board of the sending node may receive the plurality of first optical powers reported by the OA of the sending node and the first timepoints in a one-to-one correspondence with the plurality of first optical powers.

402. The receiving node obtains at least two second optical powers.

After the first optical power output by the sending node is transmitted to the receiving node by using an optical fiber, an OA of the receiving node may correspondingly detect the second optical power, and read one second optical power at a predetermined time interval. In addition, after reading the second optical power every time, the OA of the receiving node may report the second optical power to an SCC board of the receiving node. In this way, the SCC board of the receiving node may receive the at least two second optical powers reported by the OA of the receiving node.

403. The receiving node sends at least two data packets to the sending node.

One data packet of the at least two data packets is a data packet obtained by encoding one second optical power of the at least two second optical powers. Each time after receiving a second optical power, the SCC board of the receiving node may encode the second optical power by using an encoding/decoding area to obtain a data packet, and send the data packet to an OSC board of the receiving node, so that the OSC board of the receiving node sends the data packet to an OSC board of the sending node by using the optical fiber. Because a data volume of data packets obtained by encoding the second optical powers is less than a data volume of the second optical powers, and the data volume is directly proportional to a transmission delay, the transmission delay is reduced by transmitting the encoded second optical power to the sending node.

404. The sending node receives the at least two data packets sent by the receiving node.

405. The sending node decodes the at least two data packets, to obtain the at least two second optical powers, and obtains second timepoints in a one-to-one correspondence with the at least two second optical powers.

Each time after receiving a data packet sent by the OSC board of the receiving node, the OSC board of the sending node may decode the data packet to obtain a second optical power, and report the second optical power to the SCC board of the sending node. In this way, after the OSC board of the sending node receives the at least two data packets reported by the OSC board of the receiving node, the SCC board of the sending node may receive the at least two second optical powers reported by the OSC board of the sending node; and each time after receiving a second optical power, the SCC board of the sending node may obtain a timepoint, that is, a second timepoint, at which the second optical power is received, so as to obtain the second timepoints in a one-to-one correspondence with the at least two second optical powers.

406. The sending node stores the at least two second optical powers and the second timepoints in a one-to-one correspondence with the at least two second optical powers.

To avoid a data error caused by high-speed data transmission, after the SCC board of the sending node receives the at least two second optical powers, and obtains the second timepoints in a one-to-one correspondence with the at least two second optical powers, the SCC board of the sending node may store the at least two second optical powers and the second timepoints in a one-to-one correspondence with the at least two second optical powers by using a data buffer area.

It should be noted that, for each first optical power of the plurality of first optical powers obtained by the sending node, the sending node may compensate an output optical power by performing the following step 407 to step 410.

407. The sending node determines a target timepoint from the second timepoints in a one-to-one correspondence with the at least two second optical powers according to a preset delay and the first timepoint.

Because there is a fixed delay from obtaining the first optical power by the SCC board of the sending node to obtaining the second optical power in the same event, after the sending node stores the at least two second optical powers and the second timepoints in a one-to-one correspondence with the at least two second optical powers, the SCC board of the sending node may determine a sum of the first timepoint and the preset delay by using a delay calculation area, search for a second timepoint the same as the sum from the second timepoints in a one-to-one correspondence with the at least two second optical powers, and determine the second timepoint as the target timepoint, so as to determine a first optical power and a second optical power corresponding to the target timepoint that are in the same event.

It should be noted that the preset delay may be preconfigured on the sending node. A process of obtaining the preset delay is as follows: Starting from obtaining the first optical power by the OA of the sending node, a delay for which the SCC board of the sending node obtains the first optical power is a delay $t1$ for which the OA of the sending node reports the first optical power and the first timepoint to the SCC board of the sending node. A delay for which the SCC board of the sending node obtains the second optical power in the same event includes: a delay $t3$ for transmitting the first optical power Output by the OA of the sending node on an optical fiber, a delay $t1$ generated when the OA of the receiving node reports the second optical power in the same event to the SCC board of the receiving node, a delay $t2$ generated when the SCC board of the receiving node encodes the second optical power to obtain a data packet and sends the data packet to the OSC board of the receiving node, a delay $t3$ for transmitting the data packet sent by the OSC board of the receiving node on the optical fiber, a delay $t4$ generated when the OSC board of the sending node decodes the data packet to obtain the second optical power, and a delay $t5$ generated when the OSC board of the sending node reports the second optical power to the SCC board of the sending node. Therefore, a delay from obtaining the first optical power by the SCC board of the sending node to obtaining the second optical power in the same event is: a delay=$(t3+t1+t2+t3+t4+t5)-t1=t2+2 \times t3+t4+t5$. Values of $t2$, $t4$, and $t5$ are fixed. $t3$ may be obtained according to a formula: $t3 = n \times L/C$, where n is a refractive index of an optical fiber, C is a speed of light, and L is a length of the optical fiber. L may be obtained through manual measurement before the optical fiber is laid, or may be obtained through measurement by using an optical time domain reflectometer (Optical Time-Domain Reflectometer, OTDR) after the optical fiber is laid. Therefore, a value of $t3$ is also fixed for the optical fiber.

408. The sending node determines an absolute value of a difference between a target optical power and the first optical power.

After the SCC board of the sending node determines the target timepoint, the difference between the first optical power and the target optical power may be determined by using the delay calculation area, to obtain an actual span loss that occurs during transmission of the optical power on the optical fiber when Stokes scattering occurs.

409. The sending node determines a variation of a span loss according to the absolute value of the difference and a pre-stored inherent span loss.

The inherent span loss is a span loss when the optical power is transmitted on the optical fiber in an ideal state. After the SCC board of the sending node determines the difference between the first optical power and the target optical power, the SCC board of the sending node may determine the variation of the span loss according to the pre-stored inherent span loss by using the delay calculation area, where the variation may be an increment or may be a decrement.

For example, it is assumed that the SCC board of the sending node determines that the difference between the first optical power and the target optical power is 5 dB, and the pre-stored inherent span loss is 3 dB, The variation of the span loss determined by the SCC board of the sending node is increased by 2 dB.

410. The sending node adjusts a gain value and/or an attenuation value of the sending node according to the variation of the span loss.

After determining the variation of the span loss by using the delay calculation area, the SCC board of the sending node may send the variation of the span loss to an OA/VOA control area. The OA/VOA control area of the sending node may be used to adjust the gain value and/or the attenuation value of the sending node according to the variation of the span loss, to compensate the first optical power, so that the output optical power of the second node is restored to an ideal value in a normal working state. Specifically, the OA/VOA control area of the sending node may be used to send an adjustment command to the OA of the sending node, so that the OA of the sending node adjusts the gain value according to the adjustment command; or may be used to send an adjustment command to the VOA of the sending node, so that the VOA of the sending node adjusts the attenuation value according to the adjustment command; or may be used to send an adjustment command to the OA and the VOA of the sending node, so that the OA adjusts the gain value, and the VOA adjusts the attenuation value.

For example, according to the example in step 409, the OA/VOA control area may be used to send the adjustment command to the OA of the sending node, where the adjustment command includes that the gain value is increased by 2 dB, and the OA can adjust the gain value according to the adjustment command.

For another example, according to the example in step 409, the OA/VOA control area may be used to send the adjustment command to the VOA of the sending node, where the adjustment command includes reducing the attenuation value by 2 dB, and the VOA can adjust the attenuation value according to the adjustment command.

According to the optical power compensation method provided in this embodiment of the present invention, after the first node obtains the first optical power and the first timepoint, receives the at least two second optical powers sent by the second node, and obtains the second timepoints in a one-to-one correspondence with the at least two second optical powers, the first node may determine the target timepoint from the second timepoints in a one-to-one correspondence with the at least two second optical powers according to the preset delay and the first timepoint, determine the variation of the span loss according to the first optical power and the second optical power corresponding to the target timepoint, that is, the target optical power, and adjust the gain value and/or the attenuation value of the first node according to the variation of the span loss. In this way, the first node in this application may determine the first optical power and the target optical power that are in the same event according to the preset delay, determine the variation of the span loss according to the first optical power and the target optical power that are in the same event, and then adjust the gain value and/or the attenuation value of the first node in real time according to the variation of the span loss, thereby achieving a purpose of compensating the output optical power in real time.

In addition, the receiving node sends the data packet to the sending node, so that a transmission delay is reduced. The sending node stores the at least two second optical powers and the second timepoints in a one-to-one correspondence with the at least two second optical powers, so that a data error caused by high-speed data transmission is avoided.

Figure 10:
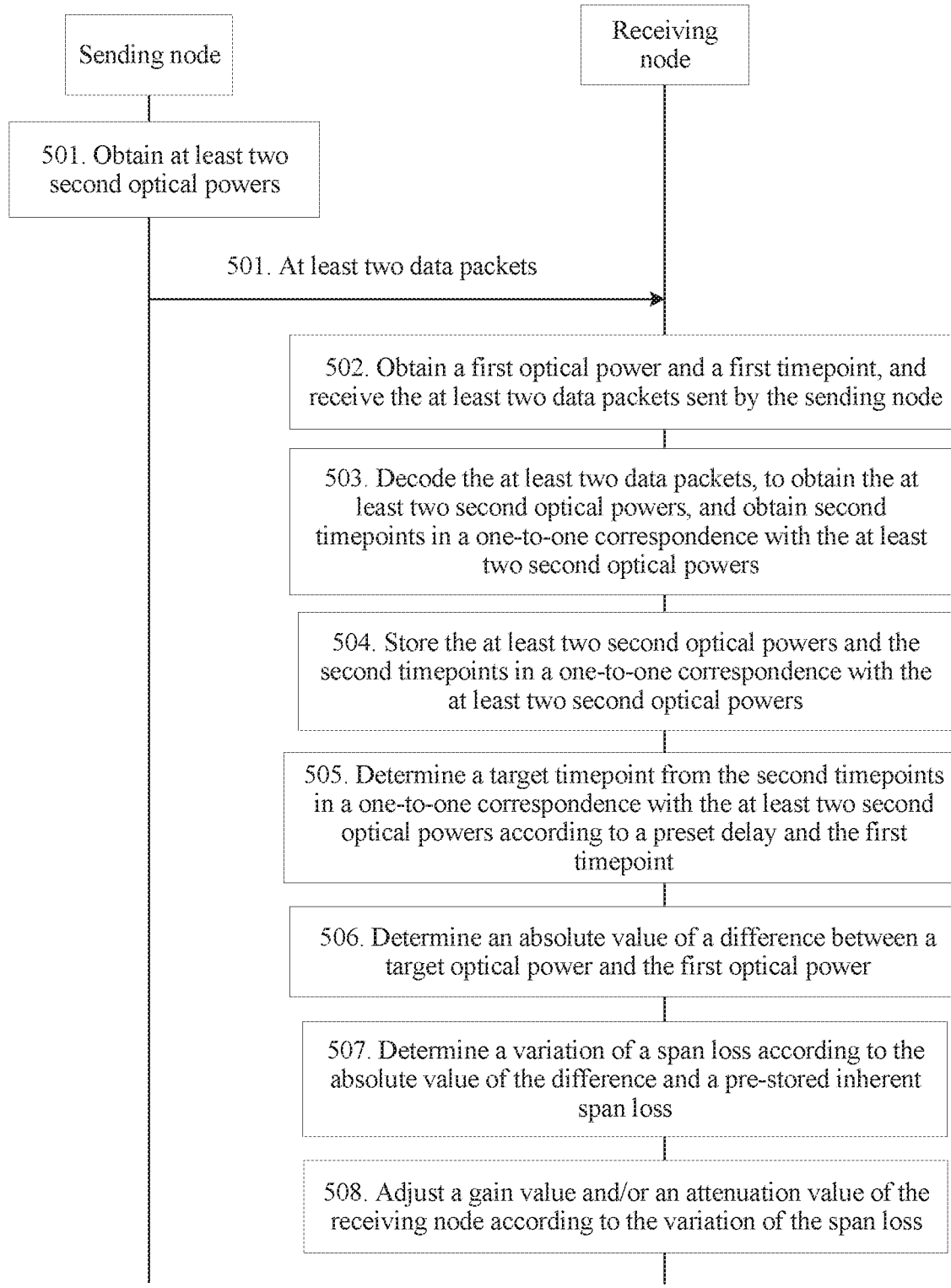
FIG. 10 is a flowchart of another optical power compensation method according to an embodiment of the present invention.

FIG. 10 is a flowchart of another optical power compensation method according to an embodiment of the present invention. As shown in FIG. 10, when a first node is a receiving node, and a second node is a sending node, the method may include the following steps.

501. The sending node obtains at least two second optical powers, and sends at least two data packets to the receiving node.

To compensate an output optical power in real time, when a long-distance optical fiber transmission WDM system starts working, an OA of the sending node may continuously output a second optical power, and read one second optical power at a predetermined time interval. In addition, each time after reading one second optical power, the OA of the sending node may report the second optical power to an SCC board of the sending node. Each time after receiving a second optical power, the SCC board of the sending node may encode the second optical power by using an encoding/decoding area to obtain a data packet, and send the data packet to an OSC board of the sending node, so that the OSC board of the sending node sends the data packet to an OSC board of the receiving node by using an optical fiber.

502. The receiving node obtains a first optical power and a first timepoint, and receives the at least two data packets sent by the sending node.

After the second optical power output by the sending node is transmitted to the receiving node by using the optical fiber, the OA of the receiving node may correspondingly detect the first optical power, read one first optical power at a predetermined time interval, and obtain a timepoint, that is, the first timepoint, at which the first optical power is detected, to obtain a plurality of first optical powers and first timepoints in a one-to-one correspondence with the plurality of first optical powers. In addition, after the OA of the receiving node reads the one first optical power every time and obtains the first timepoint corresponding to the first optical power, the OA may report the first optical power and the first timepoint to an SCC board of the receiving node. In this way, the SCC board of the receiving node may receive the plurality of first optical powers reported by the OA of the receiving node and the first timepoints in a one-to-one correspondence with the plurality of first optical powers. In addition, the OSC board of the receiving node may further receive the at least two data packets from the OSC board of the sending node.

503. The receiving node decodes the at least two data packets, to obtain the at least two second optical powers, and obtains second timepoints in a one-to-one correspondence with the at least two second optical powers.

504. The receiving node stores the at least two second optical powers and the second timepoints in a one-to-one correspondence with the at least two second optical powers.

It should be noted that detailed descriptions in step 503 and step 504 are similar to detailed descriptions in step 405 and step 406 in another embodiment of the present invention correspondingly. For detailed descriptions about step 503 and step 504, refer to the detailed descriptions in step 405 and step 406. Details are not described in this embodiment of the present invention.

It should be noted that, for each first optical power of the plurality of first optical powers obtained by the receiving node, the receiving node may compensate an output optical power by performing the following step 505 to step 508.

505. The receiving node determines a target timepoint from the second timepoints in a one-to-one correspondence with the at least two second optical powers according to a preset delay and the first timepoint.

It should be noted that the preset delay may be preconfigured on the receiving node. A process of obtaining the preset delay is as follows: Starting from obtaining the second optical power by the OA of the sending node, a delay for which the SCC board of the receiving node obtains the first optical power includes a delay t3 for transmitting the second optical power output by the OA of the sending node on an optical fiber and a delay t1 generated when the GA of the receiving node reports the first optical power and the first timepoint to the SCC board of the receiving node. A delay for which the SCC board of the receiving node obtains the second optical power in the same event includes: a delay t1 generated when the OA of the sending node reports the second optical power in the same event to the SCC board of the sending node, a delay t2 generated when the SCC board of the sending node encodes the second optical power to obtain a data packet and sends the data packet to the OSC board of the sending node, a delay t3 for transmitting the data packet sent by the OSC board of the sending node on the optical fiber, a delay t4 generated when the OSC board of the receiving node decodes the data packet to obtain the second optical power, and a delay t5 generated when the OSC board of the receiving node reports the second optical power to the SCC board of the receiving node. Therefore, a delay from obtaining the first optical power by the SCC board of the receiving node to obtaining the second optical power in the same event is: a delay=(t1+t2+t3+t4+t5)−(t3+t1)=t2+t4+t5.

506. The receiving node determines an absolute value of a difference between a target optical power and the first optical power.

After the SCC board of the receiving node determines the target timepoint, the difference between the target optical power and the first optical power may be calculated by using a delay calculation area, to obtain an actual span loss of transmitting the optical power on the optical fiber when Stokes scattering occurs.

507. The receiving node determines a variation of a span loss according to the absolute value of the difference and a pre-stored inherent span loss.

It should be noted that a detailed description in step 507 is similar to a detailed description in step 409 in another embodiment of the present invention. For detailed description about step 507, refer to the detailed description in step 409.

508. The receiving node adjusts a gain value and/or an attenuation value of the receiving node according to the variation of the span loss.

After determining the variation of the span loss by using the delay calculation area, the SCC board of the receiving node may send the variation of the span loss to an OA/VOA control area. The OA/VOA control area of the receiving node may be used to adjust the gain value and/or the attenuation value of the receiving node according to the variation of the span loss, to compensate the output optical power of the receiving node, so that the output optical power is restored to an ideal value in a normal working state. It should be noted that, for detailed descriptions about how to adjust the gain value and/or the attenuation value of the receiving node, refer to related descriptions in step 410 in another embodiment of the present invention.

According to the optical power compensation method provided in this embodiment of the present invention, after the first node obtains the first optical power and the first timepoint, receives the at least two second optical powers sent by the second node, and obtains the second timepoints in a one-to-one correspondence with the at least two second optical powers, the first node may determine the target timepoint from the second timepoints in a one-to-one correspondence with the at least two second optical powers according to the preset delay and the first timepoint, determine the variation of the span loss according to the first optical power and the second optical power corresponding to the target timepoint, that is, the target optical power, and adjust the gain value and/or the attenuation value of the first node according to the variation of the span loss. In this way, the first node in this application may determine the first optical power and the target optical power that are in the same event according to the preset delay, determine the variation of the span loss according to the first optical power and the target optical power that are in the same event, and then adjust the gain value and/or the attenuation value of the first node in real time according to the variation of the span loss, thereby achieving a purpose of compensating the output optical power in real time.

In addition, the sending node sends the data packet to the receiving node, so that a transmission delay is reduced. The receiving node stores the at least two second optical powers and the second timepoints in a one-to-one correspondence with the at least two second optical powers, so that a data error caused by high-speed data transmission is avoided.

The foregoing has described solutions provided in the embodiments of the present invention mainly from a perspective of interaction between network elements. It may be understood that to achieve the foregoing functions, each network element, such as the first node, includes a corresponding hardware structure and/or software module for implementing each function. A person skilled in the art should be aware that, the algorithm steps in each example described with reference to the embodiments disclosed in this specification can be implemented in a form of hardware or a combination of hardware and computer software. Whether the functions are implemented by hardware or are implemented in a manner in which computer software drives hardware depends on specific applications and design constraint requirements of the technical solutions. A person skilled in the art may use different methods to implement the described functions for each specific application, but it should not be considered that the implementation goes beyond the scope of the present invention.

In an embodiment of the present invention, function module division may be performed on the first node according to the foregoing method example. For example, each function module may be obtained through division according to a corresponding function, or two or more functions may be integrated into one processing module. The foregoing integrated module may be implemented in a form of hardware, or may be implemented in a form of a software function module. It should be noted that the module division in the embodiments of the present invention is an example, and is merely logical function division and may be another division manner in actual implementation.

Figure 11:
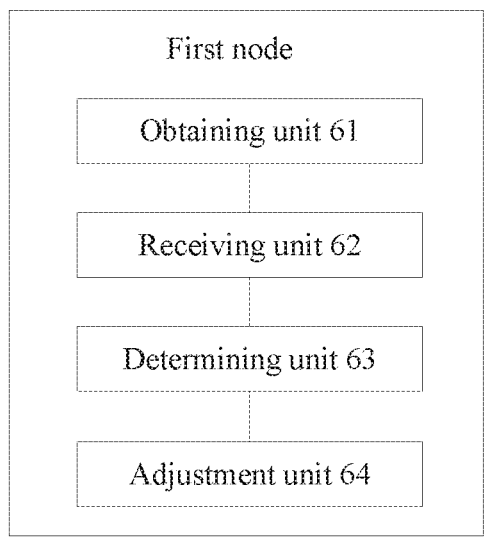
FIG. 11 is a schematic diagram of composition of another first node according to an embodiment of the present invention.

When each function module is obtained through division according to a corresponding function, FIG. 11 shows a schematic diagram of possible composition of the first node described in the foregoing embodiments. As shown in FIG. 11, the first node may include an obtaining unit 61, a receiving unit 62, a determining unit 63, and an adjustment unit 64.

The obtaining unit 61 is configured to support the first node in performing step 301 and the obtaining second timepoints in a one-to-one correspondence with the at least two second optical powers in step 302 in an optical power compensation method shown in FIG. 8, step 401 and the obtaining second timepoints in a one-to-one correspondence with the at least two second optical powers in step 405 in an optical power compensation method shown in FIG. 9, and the obtaining a first optical power and a first timepoint in step 502 and the obtaining second timepoints in a one-to-one correspondence with the at least two second optical powers in step 503 in an optical power compensation method shown in FIG. 10.

The receiving unit 62 is configured to support the first node in performing the receiving at least two second optical powers sent by a second node in step 302 in an optical power compensation method shown in FIG. 8, step 404 in an optical power compensation method shown in FIG. 9, and the receiving the at least two data packets sent by the sending node in step 502 in an optical power compensation method shown in FIG. 10.

The determining unit 63 is configured to support the first node in performing step 303 and step 304 in the optical power compensation method shown in FIG. 8, step 407, step 408, and step 409 in the optical power compensation method shown in FIG. 9, and step 505, step 506, and step 507 in the optical power compensation method shown in FIG. 10.

The adjustment unit 64 is configured to support the first node in performing step 305 in the optical power compensation method shown in FIG. 8, step 410 in the optical power compensation method shown in FIG. 9, and step 508 in the optical power compensation method shown in FIG. 10.

Figure 12:
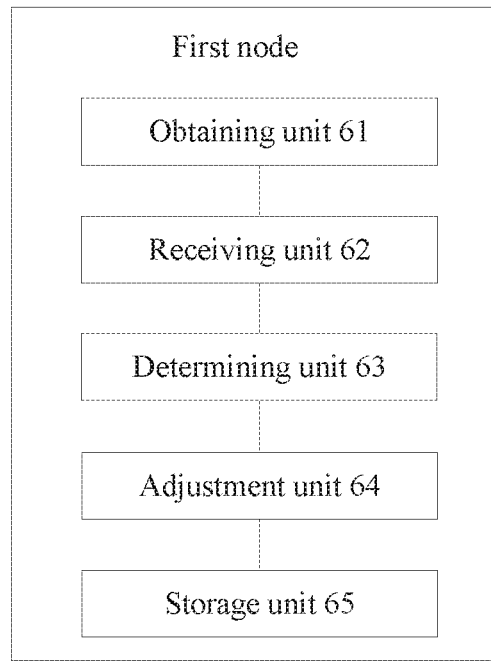
FIG. 12 is a schematic diagram of composition of another first node according to an embodiment of the present invention.

In an embodiment of the present invention, as shown in FIG. 12, the first node may further include a storage unit 65.

The storage unit 65 is configured to support the first node in performing step 406 in the optical power compensation method shown in FIG. 9 and step 504 in the optical power compensation method shown in FIG. 10.

It should be noted that all the related content of the steps used in the method embodiments may be cited in function descriptions of corresponding function modules.

The first node provided in this embodiment of the present invention is configured to perform the foregoing optical power compensation method, and therefore effects that are the same as those in the foregoing optical power compensation method can be achieved.

Figure 13:
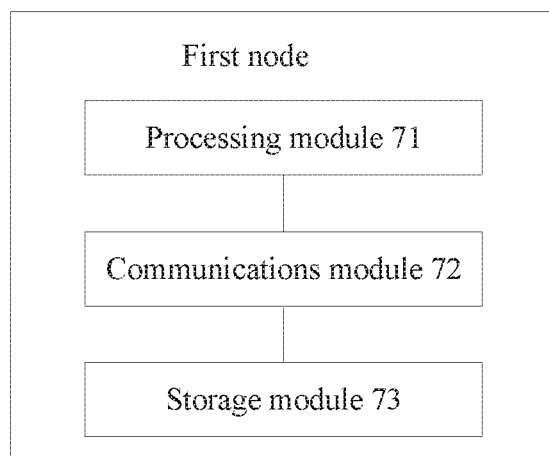
FIG. 13 is a schematic diagram of composition of another first node according to an embodiment of the present invention.

When an integrated unit is used, FIG. 13 shows a schematic structural diagram of possible composition of the first node described in the foregoing embodiments. As shown in FIG. 13, the first node includes a processing module 71 and a communications module 72.

The processing module 71 is configured to control and manage an action of the first node. For example, the processing module 71 is configured to support the first node in performing step 301, the obtaining second timepoints in a one-to-one correspondence with the at least two second optical powers in step 302, step 303, step 304, and step 305 in FIG. 8, step 401, step 405, step 407, step 408, step 409, and step 410 in FIG. 9, the obtaining a first optical power and a first timepoint in step 502, step 503, step 505, step 506, step 507, and step 508 in FIG. 10, and/or another process of technologies described in this specification. The communications module 72 is configured to support communication between the first node and another network entity. For example, the communications module 72 is configured to support the first node in performing the receiving at least two second optical powers sent by a second node in step 302 in FIG. 8, step 404 in FIG. 9, and the receiving the at least two data packets sent by the sending node in step 502 in FIG. 10. The first node may further include a storage module 73, configured to store program code and data that are of the first node. For example, the storage module 73 is configured to support the first node in performing step 406 in FIG. 9 and step 504 in FIG. 10.

The processing module 71 may be a processor or a controller. The processing module may implement or perform various example logical blocks, modules, and circuits described with reference to content disclosed herein. Alternatively, the processing module 71 may be a combination of processors implementing a computing function, for example, one or a combination of more than one microprocessor, or a combination of a DSP and a microprocessor. The communications module 72 may be a transceiver, a transceiver circuit, a communications interface, or the like. The storage module 73 may be a memory.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above.

In the embodiments provided in this application, it should be understood that the disclosed apparatus and method may be implemented in other manners. For example, the described apparatus embodiment is merely an example. For example, the module or unit division is merely one logical function division and other divisions may be used in actual implementations. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed across different places. Some or all of the units may be selected according to actual requirements to achieve the objectives of the solutions of the embodiments.

In addition, function units in the embodiments of the present invention may be integrated into one processing unit, or each of the units may exist alone physically, or two or more units are integrated into one unit. The foregoing integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementations of the present invention, but are not intended to limit the protection scope of the present invention. Any equivalent variation or replacement within the technical scope disclosed in the present invention shall fall within the protection scope of the present invention. Therefore, the scope of the present invention shall be defined by the claims.

What is claimed is:

1. An optical power compensation method comprising:
   obtaining a first optical power and a first timepoint;
   receiving at least two second optical powers;
   obtaining second timepoints in a one-to-one correspondence with the at least two second optical powers, wherein the second timepoint is a timepoint at which the second optical power is received;

determining a target timepoint from the second timepoints in a one-to-one correspondence with the at least two second optical powers according to a preset delay and the first timepoint;

determining a variation of a span loss according to a target optical power and the first optical power, wherein the target optical power is a second optical power corresponding to the target timepoint; and adjusting a gain value and/or an attenuation value according to the variation of the span loss; wherein the first timepoint comprises a timepoint at which the first optical power is outputting or detected.

2. The method according to claim 1, wherein determining a variation of a span loss according to a target optical power and the first optical power comprises:

determining an absolute value of a difference between the target optical power and the first optical power; and determining the variation of the span loss according to the absolute value of the difference and a pre-stored inherent span loss.

3. The method according to claim 1, wherein receiving at least two second optical powers comprises:

receiving at least two data packets sent by a node, wherein one data packet of the at least two data packets comprises a data packet obtained after one second optical power of the at least two second optical powers is encoded; and decoding the at least two data packets, to obtain the at least two second optical powers.

4. The method according to claim 2, wherein receiving at least two second optical powers sent by a node comprises:

receiving at least two data packets sent by the node, wherein one data packet of the at least two data packets comprises a data packet obtained after one second optical power of the at least two second optical powers is encoded; and decoding the at least two data packets, to obtain the at least two second optical powers.

5. The method according to claim 1, wherein after receiving at least two second optical powers sent by the node, and obtaining second timepoints in a one-to-one correspondence with the at least two second optical powers, the method further comprises:

saving the at least two second optical powers and the second timepoints in a one-to-one correspondence with the at least two second optical powers.

6. The method according to claim 3, wherein the preset delay comprises: a delay for transmitting the first optical power output by an optical amplifier (OA) on an optical fiber, a delay generated when a system control and communication (SCC) board of the node encodes the target optical power to obtain a data packet and sends the data packet to an optical supervisory channel (OSC) board of the node, a delay for transmitting the data packet sent by the OSC board of the node on the optical fiber, a delay generated when an OSC board of a further node decodes the data packet to obtain the target optical power, and a delay generated when the OSC board of the further node reports the target optical power to an SCC board of the further node; or the preset delay comprises: a delay generated when an SCC board of the node encodes the target optical power to obtain a data packet and sends the data packet to an OSC board of the node, a delay generated when an OSC board of a further node decodes the data packet to obtain the target optical power, and a delay generated when the OSC board of the further node reports the target optical power to an SCC board of the further node.

7. The method according to claim 5, wherein the preset delay comprises: a delay for transmitting the first optical power output by an optical amplifier (OA) on an optical fiber, a delay generated when a system control and communication (SCC) board of the node encodes the target optical power to obtain a data packet and sends the data packet to an optical supervisory channel (OSC) board of the node, a delay for transmitting the data packet sent by the OSC board of the node on the optical fiber, a delay generated when an OSC board of a further node decodes the data packet to obtain the target optical power, and a delay generated when the OSC board of the further node reports the target optical power to an SCC board of the further node; or the preset delay comprises: a delay generated when an SCC board of the second node encodes the target optical power to obtain a data packet and sends the data packet to an OSC board of the second node, a delay generated when an OSC board of a further node decodes the data packet to obtain the target optical power, and a delay generated when the OSC board of the further node reports the target optical power to an SCC board of the further node.

8. A node comprising:

at least one processor configured to obtain a first optical power, a first timepoint and a preset delay;

a receiver configured to receive at least two second optical powers from a second node;

the at least one processor is further configured to obtain second timepoints in a one-to-one correspondence with the at least two second optical powers, wherein the second timepoint is a timepoint at which the node receives the second optical power;

the at least one processor is further configured to: determine, according to the preset delay and the first timepoint, a target timepoint from the second timepoints; and determine, according to a target optical power and the first optical power, a variation of a span loss, wherein the target optical power is a second optical power corresponding to the target timepoint; and an adjuster configured to adjust a gain value and/or an attenuation value of the node according to the variation of the span loss; wherein the node comprises at least one of a sending node and a receiving node, and the first timepoint is a timepoint at which the node outputs or detects the first optical power.

9. The node according to claim 8, wherein the at least one processor is configured to:

determine an absolute value of a difference between the target optical power and the first optical power; and determine the variation of the span loss according to the absolute value of the difference and a pre-stored inherent span loss.

10. The node according to claim 8, wherein the receiver is configured to:

receive at least two data packets sent by the second node, wherein one data packet of the at least two data packets is a data packet obtained after one second optical power of the at least two second optical powers is encoded; and decode the at least two data packets, to obtain the at least two second optical powers.

11. The node according to claim 8, wherein the node further comprises a memory configured to store the at least two second optical powers and the second timepoints in a one-to-one correspondence with the at least two second optical powers.

12. The node according to claim 10, wherein:
the node comprises a sending node and the preset delay comprises: a delay for transmitting the first optical power output by an optical amplifier (OA) of the first node on an optical fiber, a delay generated when a system control and communication (SCC) board of the second node encodes the target optical power to obtain a data packet and sends the data packet to an optical supervisory channel (OSC) board of the second node, a delay for transmitting the data packet sent by the OSC board of the second node on the optical fiber, a delay generated when an OSC board of the node decodes the data packet to obtain the target optical power, and a delay generated when the OSC board of the node reports the target optical power to an SCC board of the node; or
the node comprises a receiving node, and the preset delay comprises: a delay generated when an SCC board of the second node encodes the target optical power to obtain a data packet and sends the data packet to an OSC board of the second node, a delay generated when an OSC board of the node decodes the data packet to obtain the target optical power, and a delay generated when the OSC board of the node reports the target optical power to an SCC board of the node.

13. A node, comprising at least one processor, a memory, a communications interface, and a communications bus, wherein
the memory is configured to store at least one computer-executable instruction; the processor, the communications interface, and the memory are connected by using the communications bus; and the processor executes the computer-executable instruction stored by the memory, so that the node performs operations comprising:
obtaining a first optical power and a first timepoint;
receiving at least two second optical powers sent by a second node, and obtaining second timepoints in a one-to-one correspondence with the at least two second optical powers, wherein the second timepoint is a timepoint at which the node receives the second optical power;
determining a target timepoint from the second timepoints in a one-to-one correspondence with the at least two second optical powers according to a preset delay and the first timepoint;
determining a variation of a span loss according to a target optical power and the first optical power, wherein the target optical power is a second optical power corresponding to the target timepoint; and
adjusting a gain value and/or an attenuation value according to the variation of the span loss; wherein
the node comprises a sending node and the first timepoint comprises a timepoint at which the first node outputs the first optical power; or, the node comprises a receiving node and the first timepoint comprises a timepoint at which the node detects the first optical power.

14. The first node according to claim 13, wherein determining a variation of a span loss according to a target optical power and the first optical power comprises:
determining an absolute value of a difference between the target optical power and the first optical power; and
determining the variation of the span loss according to the absolute value of the difference and a pre-stored inherent span loss.

15. The method according to claim 13, wherein receiving at least two second optical powers sent by a second node comprises:
receiving at least two data packets sent by the second node, wherein one data packet of the at least two data packets comprises a data packet obtained after one second optical power of the at least two second optical powers is encoded; and
decoding the at least two data packets, to obtain the at least two second optical powers.

16. The method according to claim 14, wherein receiving at least two second optical powers sent by the second node comprises:
receiving at least two data packets sent by the second node, wherein one data packet of the at least two data packets comprises a data packet obtained after one second optical power of the at least two second optical powers is encoded; and
decoding the at least two data packets, to obtain the at least two second optical powers.

17. The method according to claim 13, wherein after receiving at least two second optical powers sent by a second node, and obtaining second timepoints in a one-to-one correspondence with the at least two second optical powers, the node further performs:
saving the at least two second optical powers and the second timepoints in a one-to-one correspondence with the at least two second optical powers.

18. The method according to claim 15, wherein the node comprises a sending node and the preset delay comprises: a delay for transmitting the first optical power output by an optical amplifier (OA) on an optical fiber, a delay generated when a system control and communication (SCC) board of the second node encodes the target optical power to obtain a data packet and sends the data packet to an optical supervisory channel (OSC) board of the second node, a delay for transmitting the data packet sent by the OSC board of the second node on the optical fiber, a delay generated when an OSC board of the node decodes the data packet to obtain the target optical power, and a delay generated when the OSC board of the node reports the target optical power to an SCC board of the node; or
the node comprises a receiving node, and the preset delay comprises: a delay generated when an SCC board of the second node encodes the target optical power to obtain a data packet and sends the data packet to an OSC board of the second node, a delay generated when an OSC board of the node decodes the data packet to obtain the target optical power, and a delay generated when the OSC board of the node reports the target optical power to an SCC board of the node.

19. The method according to claim 17, wherein when the node comprises a sending node, and the preset delay comprises: a delay for transmitting the first optical power output by an optical amplifier (OA) of the node on an optical fiber, a delay generated when a system control and communication (SCC) board of the second node encodes the target optical power to obtain a data packet and sends the data packet to an optical supervisory channel (OSC) board of the second node, a delay for transmitting the data packet sent by the OSC board of the second node on the optical fiber, a delay generated when an OSC board of the node decodes the data packet to obtain the target optical power, and a delay generated when the OSC board of the node reports the target optical power to an SCC board of the node; or the node comprises a receiving node, and the preset delay comprises: a delay generated when an SCC board of the second node encodes the target optical power to obtain a data packet and sends the data packet to an OSC board of the second node, a delay generated when an OSC board of the node decodes the data packet to obtain the target optical power, and a delay generated when the OSC board of the node reports the target optical power to an SCC board of the node.

* * * * *